United States Patent [19]

Holman

[11] Patent Number: 5,522,476
[45] Date of Patent: Jun. 4, 1996

[54] LUBRICATION SYSTEM FOR VEHICLE TRANSMISSION

[75] Inventor: James L. Holman, Wauseon, Ohio

[73] Assignee: Dana Corporation, Toledo, Ohio

[21] Appl. No.: 347,265

[22] Filed: Nov. 30, 1994

[51] Int. Cl.⁶ ............................................. F01M 9/00
[52] U.S. Cl. ........................... 184/6.12; 184/27.1; 74/467
[58] Field of Search ............................ 184/6.12, 27.1; 74/467

[56] References Cited

U.S. PATENT DOCUMENTS

| | | | |
|---|---|---|---|
| 1,429,466 | 9/1922 | Turnbull | 184/6.12 |
| 2,077,580 | 4/1937 | Patterson | 184/6.12 |
| 2,263,092 | 11/1941 | Johnson | 184/6.12 |
| 3,407,741 | 10/1968 | Weber et al. | |
| 3,550,724 | 12/1970 | Vollmer | |
| 3,719,253 | 3/1973 | Dukes et al. | |
| 4,356,889 | 11/1982 | Teeter | |
| 4,429,587 | 2/1984 | Finn, III et al. | 184/6.12 |
| 4,712,442 | 12/1987 | Baika et al. | 74/467 |
| 5,279,391 | 1/1994 | Ward | |

FOREIGN PATENT DOCUMENTS 1303776  4/1987  U.S.S.R. .................................. 74/467

OTHER PUBLICATIONS

ASO–10S Series Main Transmission brochure, p. 26 (Apr. 1994).
Eaton Truck Components Bulletin Trans IB–212 (Dec. 1993).
Eaton Fuller RTLO 16618 Series Illustrated Parts List (Sep. 1992).

Primary Examiner—Thomas E. Denion
Attorney, Agent, or Firm—MacMillan, Sobanski & Todd

[57] ABSTRACT

A lubricant distribution system for a vehicle transmission includes an internal fluid pump which draws lubricant from a sump defined in the transmission housing through an intake tube and a first channel formed in an interior wall of the housing. The lubricant is delivered from the pump through a second channel formed in the interior wall to a first port formed in an outer wall of the housing. A third channel is also formed in the interior wall, extending from a second port formed in the outer wall to an internal passageway formed within the interior wall. The ports may be used to circulate lubricant from the transmission to one or more external devices for conditioning the lubricant. Alternatively, a cover plate secured to the housing may provide direct communication between the two ports. A bypass channel may be formed in the interior wall between the second channel and the third channel. A pressure relief valve disposed in the bypass channel prevents fluid flow therethrough unless the pressure of the lubricant in the second channel exceeds a predetermined value. The various channels are all formed having generally U-shaped cross sections and are closed by a cover plate to define respective fluid passageways. The lubricant passes from the internal passageway to a lubricant discharge tube supported in a bore formed through the interior wall. The lubricant discharge tube includes one or more resilient outwardly extending tabs which provide a bayonet type mounting thereof in the bore. The lubricant discharge tube includes first and second legs having respective pluralities of apertures formed therein. Lubricant sprayed from the apertures falls from the meshing gears and bearings under the influence of gravity and is collected in the sump.

22 Claims, 5 Drawing Sheets

5,522,476

LUBRICATION SYSTEM FOR VEHICLE TRANSMISSION

BACKGROUND OF THE INVENTION

This invention relates in general to vehicle transmissions and in particular to an improved system for distributing lubricant to the gears and bearings in a vehicle transmission.

In most vehicles, a transmission is provided in the drive train between the engine and the driven wheels. As is well known, the transmission includes a housing containing an input shaft, an output shaft, and a plurality of meshing gears which are selectively connected between the input shaft and the output shaft. The meshing gears contained within the transmission housing are of varying size so as to provide a plurality of speed reduction gear ratios between the input shaft and the output shaft. By appropriate selection of these meshing gears, a desired speed reduction gear ratio can be obtained between the input shaft and the output shaft. As a result, acceleration and deceleration of the vehicle can be accomplished in a smooth and efficient manner.

Typically, this gear ratio selection is accomplished by moving one or more control members provided within the transmission. Movement of the control member causes certain ones of the meshing gears to be connected between the input shaft and the output shaft so as to provide the desired gear ratio therebetween. In a manual transmission., movement of the control member is accomplished by manual exertion of the vehicle driver, such as through a shift lever. In an automatic transmission, movement of the control member is accomplished by a pneumatic or hydraulic actuator in response to predetermined operating conditions.

In both manual and automatic transmissions, it is known to provide lubricant within the transmission for minimizing the adverse effects of friction caused by the meshing gears contained therein. In the past, the lower portion of the housing of the transmission functioned as a sump for the lubricant. Portions of the meshing gears of the transmission were partially submerged in the lubricant. Thus, when such gears were rotated during use, the lubricant was carried thereon or splashed into the meshing teeth thereof so as to provide lubrication.

Although this sump type of lubrication system has functioned successfully in the past, it has been found to have several drawbacks. First, a certain amount of clearance space must be provided between the lower portions of the meshing gears and the housing of the transmission. Consequently, a relatively large amount of lubricant is required to fill the sump of the transmission housing to a sufficiently high level to insure that all of the meshing gears are at least partially submerged therein. This relatively large amount of lubricant adds unnecessary weight and expense to the transmission.

Second, transmissions are often operated at an angle which is inclined relative to the horizontal. In some instances, the transmission is installed within the vehicle at an angle which is inclined relative to the horizontal. In other instances, the transmission is installed horizontally within to the vehicle, but the vehicle is operated on an inclined surface, such as when climbing a hill. In either event, because gravity maintains the level of the lubricant horizontal, some of the meshing gears in the transmission are often deeply submerged in the lubricant during operation while others are only partially submerged. The continuous rotation of the deeply submerged gears causes unnecessary churning of the lubricant in the sump, which results in a loss of efficiency and increased lubricant temperature.

The problem of increased lubricant temperature has been addressed in the past by mounting a pump on the exterior of the transmission. The pump is connected to a rotating shaft contained within the transmission so as to be driven thereby. The pump circulates the lubricant out of the sump, through a heat exchanger typically provided at the front of the vehicle, and back into the sump. Unfortunately, this relatively lengthy and complicated fluid path also resulted in loss of efficiency. Thus, it would be desirable to provide an improved system for distributing lubricant to the various gears and bearings in a vehicle transmission which addresses these drawbacks.

SUMMARY OF THE INVENTION

This invention relates to an improved system for distributing lubricant to the various gears and bearings contained within a vehicle transmission. The lubricant distribution system includes a fluid pump which is mounted within the interior of the transmission housing. The fluid pump is connected to a driven shaft contained within the transmission so as to be rotatably driven thereby whenever the transmission is operated. The pump draws lubricant from a sump defined in the lower portion of the transmission housing through an intake tube and a first channel formed in an interior wall of the transmission housing. The lubricant is delivered from the pump through a second channel formed in the interior wall of the transmission housing to a first port formed in an outer wall of the transmission housing. A third channel is also formed in the interior wall of the transmission housing, extending from a second port formed in the outer wall of the transmission housing to an internal passageway formed within the interior wall. The ports may be used to circulate lubricant from the transmission to one or more external devices for conditioning the lubricant, such as a filter or heat exchanger. Alternatively, a cover plate secured to the transmission housing may provide direct communication between the two ports. A bypass channel may be formed in the interior wall of the transmission housing between the second channel and the third channel. A pressure relief valve disposed in the bypass channel prevents fluid flow therethrough unless the pressure of the lubricant in the second channel exceeds a predetermined value. The various channels are all formed having generally U-shaped cross sections and are closed by a cover plate to define respective fluid passageways. The lubricant passes from the internal passageway to a lubricant discharge tube supported in a bore formed through the interior wall of the transmission housing. The lubricant discharge tube preferably includes one or more resilient outwardly extending tabs which provide a bayonet type mounting thereof in the bore. The lubricant discharge tube includes first and second legs having respective pluralities of apertures formed therein. The apertures are located above the various gears and bearings contained within the transmission. Lubricant sprayed from the apertures falls from the meshing gears and bearings under the influence of gravity and is collected in the sump defined in the lower portion of the transmission housing so as to be recirculated.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
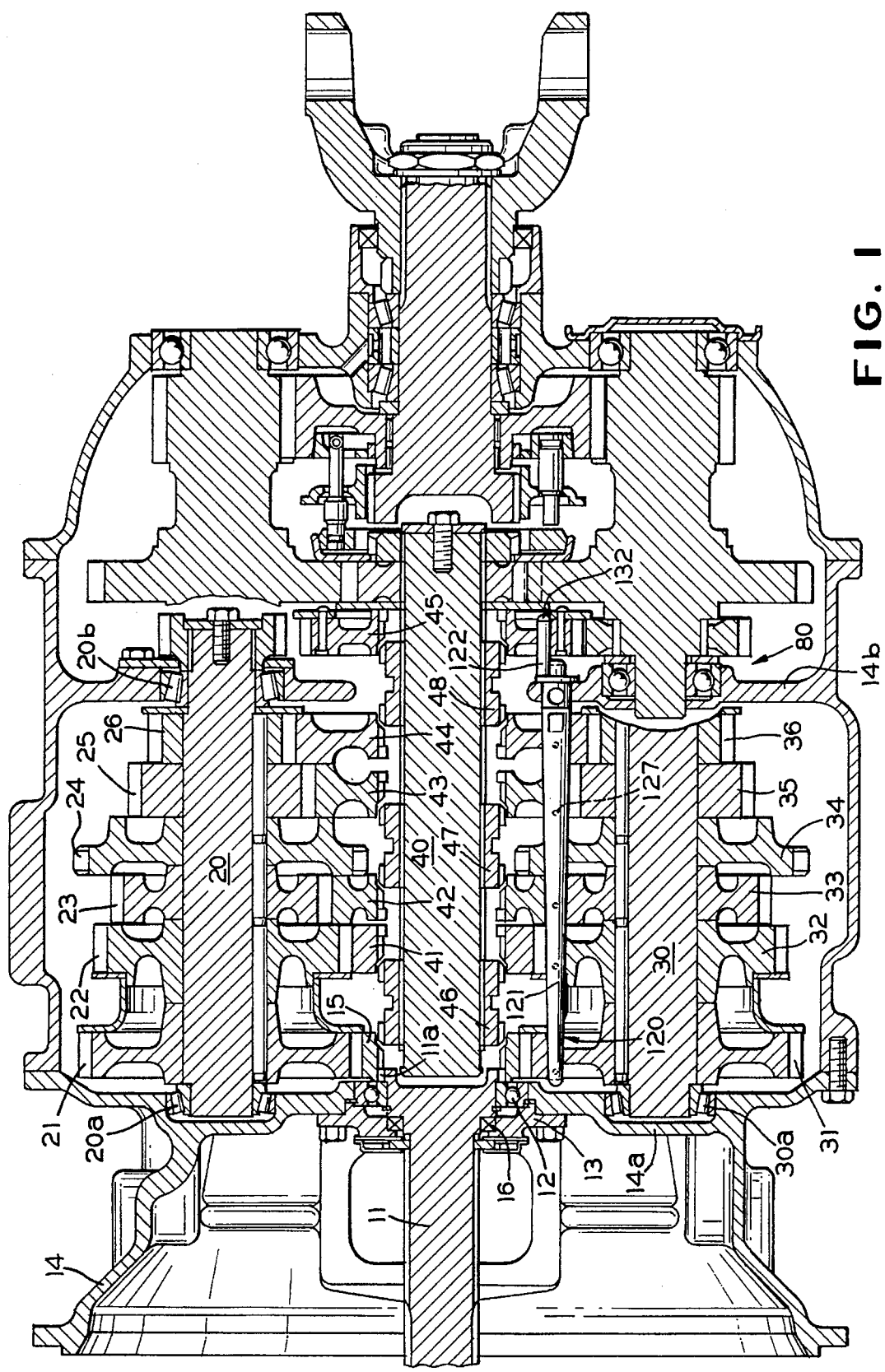
FIG. 1 is a top plan view, partially in cross section, of a vehicle transmission including a lubricant distribution sys
Figure 2:
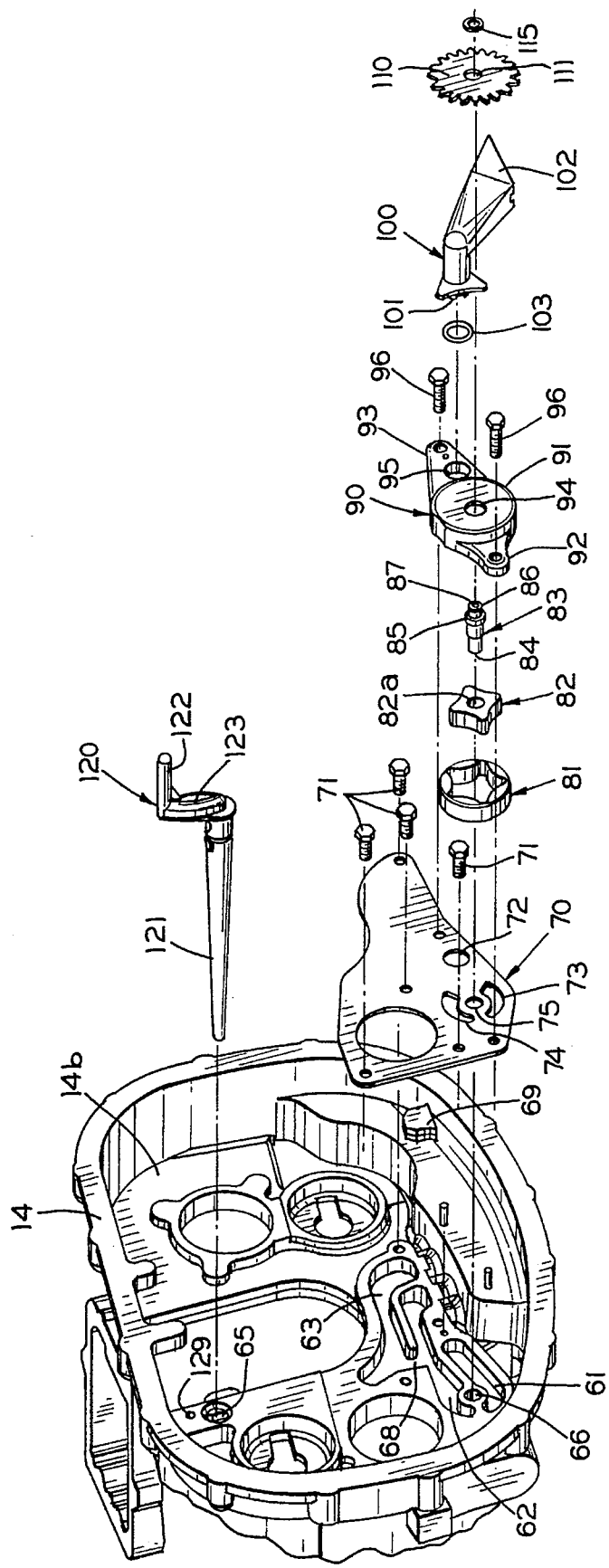
- FIG. 2 is an exploded perspective view of a portion of the transmission and the lubricant distribution system illustrated in FIG. 1.

Referring now to the drawings, there is illustrated in FIG. 1 a twin countershaft compound transmission, indicated generally at 10. The transmission 10 is generally conventional in the art and is intended to be representative of any known vehicle transmission structure, either manually or automatically shifted. As a result, only a brief overview of the structure and operation of the illustrated transmission 10 is necessary for a complete understanding of the lubricant distribution system of this invention. The transmission 10 includes an input shaft 11 which is adapted to be rotatably driven, such as by a conventional internal combustion or diesel engine (not shown). If desired, a conventional clutch (not shown) may be connected between the vehicle engine and the input shaft 11 of the transmission 10. The input shaft 11 is supported for rotation by a bearing 12 mounted in an opening formed through a bearing cap 13 secured to a forward wall 14a of a case or housing 14 for the transmission 10. The axial inner end of the input shaft 11 is formed having an integral toothed gear portion 11a which meshes with a plurality of radially inwardly extending teeth formed on an annular input drive gear 15. A seal 16 is provided about the input shaft 11 for preventing lubricant contained within the transmission 10 from escaping, as will be described in detail below.

Within the transmission housing 14, a first countershaft 20 is rotatably supported on a pair of tapered roller bearings 20a and 20b. The forward tapered roller bearing 20a is received within a recess formed in the inner surface of the forward wall 14a of the transmission housing 14. The rearward tapered roller bearing 20b is received within a recess formed in the inner surface of an interior wall 14b of the transmission housing 14. A plurality of gears 21, 22, 23, 24, 25, and 26 are splined onto the first countershaft 20 for rotation therewith. The input drive gear 15 further includes a plurality of radially outwardly extending teeth which mesh with a corresponding plurality of teeth formed on the first one 21 one of the first countershaft gears. Thus, when the input shaft 11 is rotated, the input drive gear 15, the first countershaft 20, and all of the first countershaft gears 21 through 26 are rotated therewith. Similarly, a second countershaft 30 is rotatably supported within the transmission housing 14 on a pair of tapered roller bearings 30a (only one is illustrated). A plurality of gears 31, 32, 33, 34, 35, and 36 are splined onto the second countershaft 30 for rotation therewith. The radially outwardly extending teeth of the input drive gear 15 also mesh with a corresponding plurality of teeth formed on the first one 31 of the second countershaft gears. Thus, when the input shaft 11 is rotated, the input drive gear 15, the second countershaft 30, and all of the second countershaft gears 31 through 36 are also rotated therewith.

A splined main shaft 40 is also provided within the transmission housing 14. A plurality of annular main shaft gears 41, 42, 43, and 44 are disposed co-axially about the main shaft 40. The first main shaft gear 41 meshes with both the second one 22 of the first countershaft gears and the second one 32 of the second countershaft gears. Similarly, the remaining main shaft gears 42, 43, 44 mesh with the corresponding ones of the first countershaft gears 23, 25, 26 and the second countershaft gears 33, 35, and 36. An annular output drive gear 45 is also disposed co-axially about the main shaft 40.

A plurality of hollow cylindrical clutch collars 46, 47, and 48 are splined onto the main shaft 40 for rotation therewith. Each of the clutch collars 46, 47, and 48 is illustrated in FIG. 1 in a neutral or non-gear engaging position. However, each of the clutch collars 46, 47, and 48 is axially movable relative to the main shaft 40 between first and second gear engaging positions. For example, the first clutch collar 46 may be moved axially forwardly (toward the left when viewing FIG. 1) so as to connect the input drive gear 15 to the main shaft 40 for direct drive operation. The first clutch collar 46 may alternatively be moved axially rearwardly (toward the right when viewing FIG. 1 ) so as to connect the first main shaft gear 41 to the main shaft 40 for gear reduction operation. The other clutch collars 47 and 48 may be moved in a similar way to control the operation of the transmission 10 in a known manner.

As is well known, axial movement of the clutch collars 46, 47, and 48 is accomplished by respective shift forks (not shown) which engage each of the clutch collars 46, 47, and 48. The shift forks are mounted on respective shift rails (not shown) for axial movement therewith forwardly and rearwardly. Typically, a shift tower containing a manually operable shift lever (not shown) is provided for selecting one of the shift rails for movement and for shifting the selected shift rail forwardly or rearwardly as desired. It will be appreciated, however, that such selecting and shifting actions may alternatively be performed by any known automatic or automated manual apparatus.

As mentioned above, the illustrated transmission 10 is a compound transmission. The components of the illustrated transmission 10 thus far described constitute the main section of the transmission, which provides a predetermined number of speed reduction gear ratios. The illustrated transmission 10 further includes a conventional auxiliary section, which is located rearwardly (toward the right when viewing FIG. 1) of the main section and is separated therefrom by an interior wall 14b of the transmission housing 14. The auxiliary section also provides a predetermined number of speed reduction gear ratios in a known manner. The total number of speed reduction gear ratios available from the transmission 10 as a whole, therefore, is equal to the product of the gear ratios available from the main section and the gear ratios available from the auxiliary section. Although the illustrated transmission 10 is a compound transmission, it will be appreciated that any conventional single stage transmission may be used with the lubricant distribution system of this invention. The structure of the transmission thus far described is conventional in the art.

The transmission 10 further includes a system for distributing lubricant to the various meshing gears contained therein. Referring to FIGS. 2 through 5, the lubricant distribution system includes a plurality of channels 61, 62, and 63 which are formed in the lower portion of the interior wall 14b of the transmission housing 14. Each of the channels 61, 62 and 63 is preferably cast directly in the interior wall 14b of the transmission housing 14 and is formed having a generally U-shaped cross section. As will be explained in greater detail below, the first channel 61 functions as an inlet passageway for supplying lubricant to a pump for the lubricant distribution system. The second channel 62 functions as a first portion of an outlet passageway from the pump of the lubricant distribution system, while the third channel 63 functions as a second portion of such outlet passageway.

Figure 3:
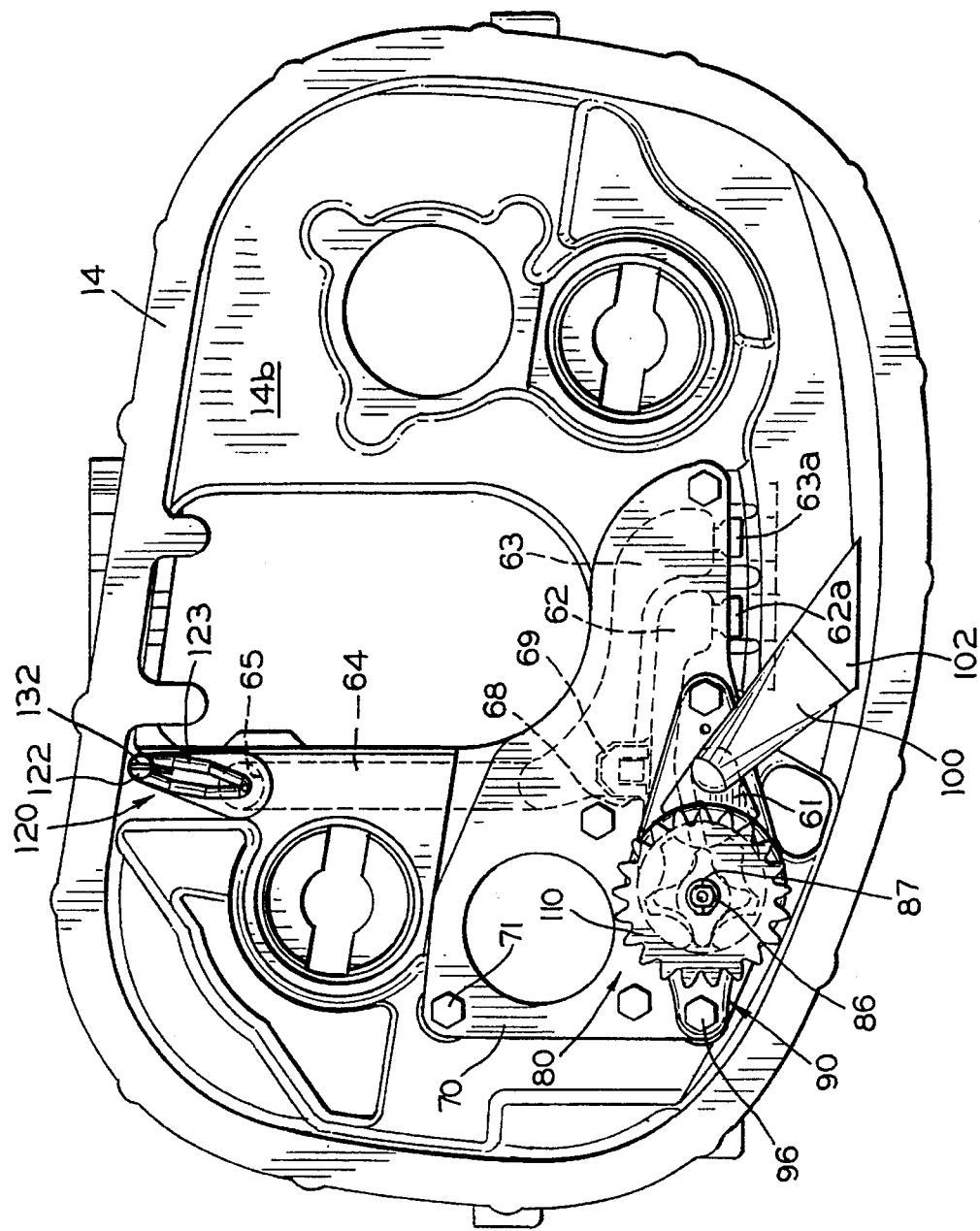
FIG. 3 is an end elevational view of a portion of the transmission and the lubricant distribution system illustrated in FIGS. 1 and 2.
Figure 5:
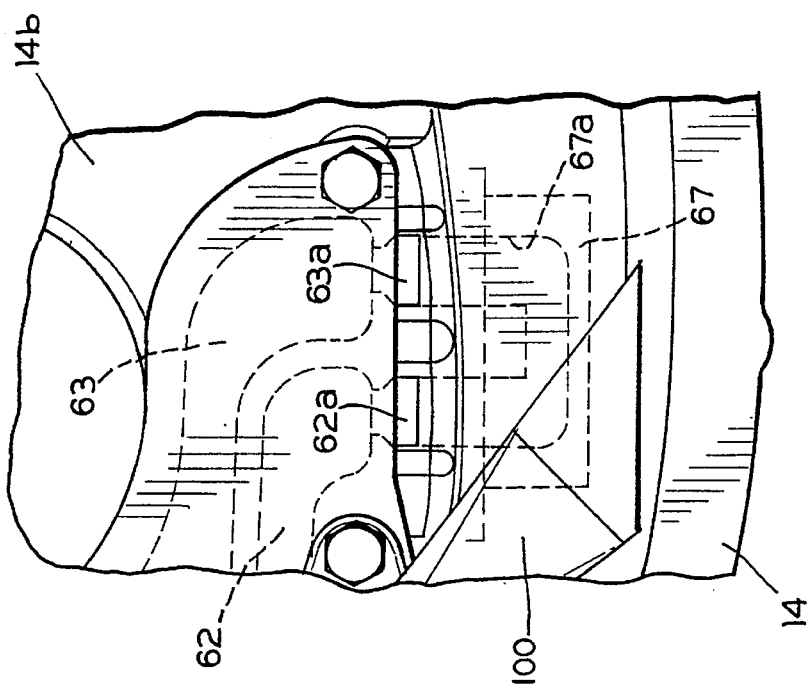
FIG. 5 is an end elevational view similar to FIG. 4 of an alternative embodiment of a portion of the lubricant distribution system in accordance with this invention.
Figure 4:
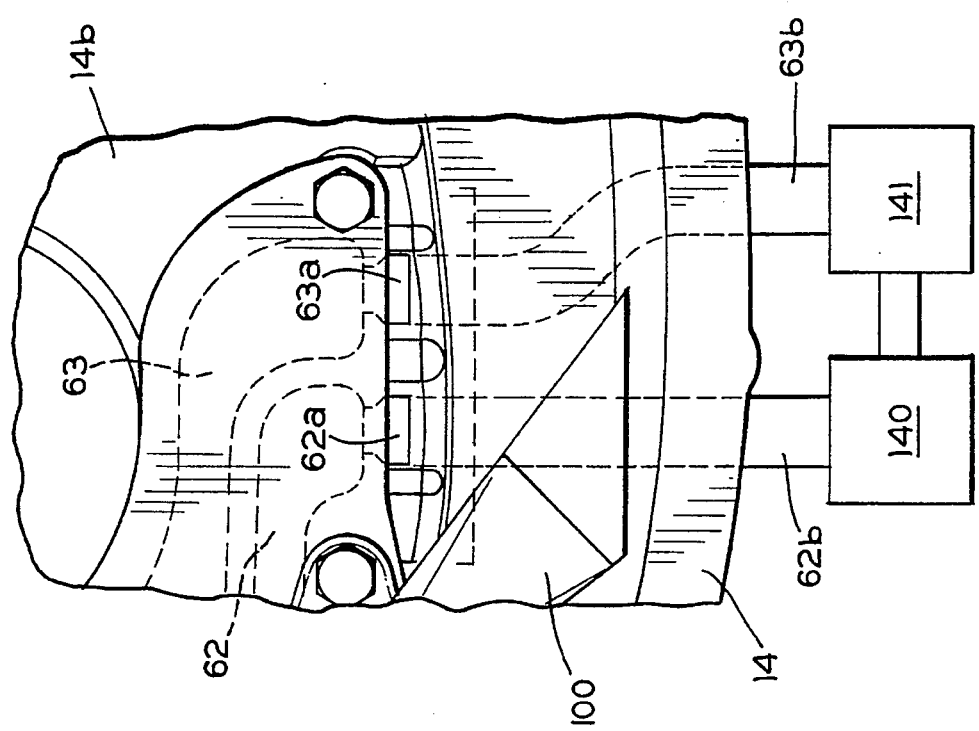
FIG. 4 is an end elevational view of a portion of the transmission and the lubricant distribution system illustrated in FIGS. 1, 2, and 3.

As shown in FIGS. 2 through 5, the second channel 62 communicates with a port 62a formed through a bottom wall of the transmission housing 14. Similarly, the third channel 63 communicates with a port 63a formed through the bottom wall of the transmission housing 14. The ports 62a and 63a are adapted to receive conventional fluid tight fittings therein which facilitate the connection of respective fluid conduits 62b and 63b (see FIG. 4) thereto. The fluid conduits 62b and 63b may be used to circulate lubricant into and out of the transmission 10 if desired. For example, the fluid conduits 62b and 63b may communicate with one or more external devices for conditioning the lubricant as it flows from the pump to the gears of the transmission 10. For example, as shown in FIG. 4, the lubricant may flow out of the port 62a, through the fluid conduit 62b to an external oil filter 140 or an external heat exchanger 141 (or both, as illustrated). Then, the lubricant may be returned through the fluid conduit 63b and the port 63a to the transmission 10. Alternatively, as shown in FIG. 5, if it is desired that no external devices be provided for conditioning the lubricant, a cover plate 67 having an internal return passageway 67a can be secured to the bottom wall of the transmission housing 14 by any suitable means, such as by threaded fasteners (not shown). The internal passageway 67a of the cover plate 67 provides for direct lubricant flow from the port 62a to the port 63a, without the use of any fluid conduits 62b and 63b or any external devices for conditioning the lubricant.

As shown in FIG. 3, an internal passageway 64 is formed within the interior wall 14b of the transmission housing 14. The lower end of the internal passageway 64 communicates with the upper end of the third channel 63. The upper end of the internal passageway 64 communicates with an axially extending bore 65 formed through the upper portion of the interior wall 14b of the transmission housing 14. Thus, the internal passageway 64 provides fluid communication between the third channel 63 and the bore 65. The purpose for this fluid communication will be explained below. Also, a counterbore 66 is formed in the interior wall 14b of the transmission housing 14 between the first passageway 61 and the second passageway 62. The purpose for the counterbore 66 will also be explained below.

A bypass channel 68 is formed in the interior wall 14b of the transmission housing 14, extending between the second channel 62 and the third channel 63. Within the bypass channel 68, a conventional pressure relief valve 69 is disposed. The pressure relief valve 69 is normally closed, thus preventing any lubricant from flowing from the second channel 62 through the bypass channel 68 to the third channel 63. However, when the pressure of the lubricant in the second channel 62 exceeds a predetermined value, the pressure relief valve 69 will open. When this occurs, lubricant flows directly from the second channel 62 through the bypass channel 68 to the third channel 63. When this occurs, the lubricant bypasses the ports 62a and 63a and any external devices for conditioning the lubricant which may be connected thereto.

The bypass channel 68 and the pressure relief valve 69 are provided to maintain the flow of lubricant through the lubricant distribution system even when such flow may be difficult. For example, under certain low temperature conditions, the lubricant may be relatively heavy and viscous, making it difficult to pump through the conduits 62b and 63b to the external devices for conditioning the lubricant. In other instances, a blockage may occur which reduces or prevents the flow of lubricant to or from the external devices for conditioning the lubricant. Under such circumstances, the pressure of the lubricant in the second channel 62 will increase as a result of the resistance to flow, causing the pressure relief valve 69 to open. Consequently, lubricant can temporarily flow directly from the second channel 62 to the third channel 63, bypassing the fluid conduits 62b and 63b and any external devices for conditioning the lubricant connected thereto. When the temperature of the lubricant subsequently rises and becomes relatively light and non-viscous, or when the blockage is removed, the pressure relief valve 69 will close, thus preventing the direct flow of lubricant frown the second channel 62 to the third channel 63 through the bypass passageway 68.

A bearing retainer plate, indicated generally at 70, is provided within the transmission housing 14. The bearing retainer plate 70 is provided to retain the rearward tapered roller bearing of the second countershaft 30 within its associated recess formed through the interior wall 14b of the transmission housing 14. To accomplish this, the beating retainer plate 70 is formed of a flat metal stamping and is secured to the interior wall 14b of the transmission housing 14 by a plurality of threaded fasteners 71. A first circular opening 72 is formed through the bearing retainer plate 70. When the beating retainer plate 70 is installed, the first circular opening 72 is aligned over and provides communication with one end of the first channel 61 formed in the interior wall 14b. A first generally arcuate slot 72 is also formed through the beating retainer plate 70. When the bearing plate 70 is installed, the first generally arcuate slot 73 is aligned over and provides communication with the opposite end of the first channel 61. Similarly, a second generally arcuate slot 74 is also formed through the bearing retainer plate 70. When the bearing plate 70 is installed, the second generally arcuate slot 74 is aligned over and provides communication with one end of the second channel 62. Lastly, a second circular opening 75 is also formed through the bearing retainer plate 70. When the bearing plate 70 is installed, the second circular opening 75 is aligned over the counterbore 66 formed in the interior wall 14b. The retainer plate 70 covers the remaining portions of each of the open channels 61, 62, 63 and 68, thereby forming respective fluid tight passageways.

The lubricant distribution system further includes a pump, indicated generally at 80. The pump 80 is conventional in the art and may be embodied as a gerotor type pump having an outer element 81 and an inner element 82. The outer element 81 is hollow, having a plurality of teeth formed on the inner surface thereof which mesh with teeth formed on the outer surface of the inner element 82. In the illustrated embodiment, the inner element 82 is formed having one less tooth than the outer element 81. The teeth on both the outer element 81 and the inner element 82 are formed having conjugately-generated tooth profiles so as to maintain continuous fluid tight contact during operation.

A central bore 82a is formed through the inner pump element 82. When installed as described below, the central bore 82a is co-axially aligned with both the opening 75 formed through the retainer plate 70 and the counterbore 66 formed in the interior wall 14b of the transmission housing 14. A generally cylindrical pump drive shaft, indicated generally at 83, extends through the central bore 82a of the inner element 82. The pump drive shaft 83 is connected to the inner element 82 by any conventional means for rotation together as a unit. For example, the pump drive shaft 83 may be press fit into the central bore 82a of the inner element 82 for concurrent rotation. The pump drive shaft 83 includes a forward end 84, an external circumferential annular shoulder 85, and a rearward end 86. When installed, the forward end 84 of the pump drive shaft 83 extends through the opening 75 of the retainer plate 70 and is received and rotatably supported within the bore 66 formed in the interior wall 14b. The rearward end 86 of the pump drive shaft 83 is formed having an axially extending flat portion 87, for a propose which will be explained below.

A pump housing, indicated generally at 90, is formed from a metal stamping and includes a main body portion 91 and a pair of generally opposed flange portions 92 and 93. When installed, the main body portion 91 of the pump housing 90 and the retainer plate 70 cooperate to form a fluid tight chamber, within which the outer and inner pump elements 81 and 82 are disposed. The outer pump element 81 has a smooth circumferential outer surface which is received within a corresponding recess formed in the main body portion 91 of the pump housing 90. Thus, the outer pump element 90 is supported for rotation within the main body portion 91. A central opening 94 is formed through the main body portion 91 of the housing 90. The pump drive shaft 83 extends through the central opening 94 such that the shoulder 85 is received therein, while the rearward end 86 extends rearwardly therefrom. The opposed flange portions 92 and 93 of the pump housing 90 have respective apertures 92a and 93a formed therethrough, through which threaded fasteners 96 extend to secure the pump housing 90 and the retainer plate 70 to the interior wall 14b of the transmission housing 14. The flange portion 93 further has an enlarged opening 95 formed therethrough which is aligned with and provides communication with the circular opening 72 formed in the retainer plate 70 and the channel 61 when the pump housing 90 is installed.

The lubricant distribution system further includes a hollow lubricant intake tube, indicated generally at 100, having an outlet end 101 and an inlet end 102. The intake tube 100 is preferably formed from a resilient plastic material, such as glass filled nylon. The outlet end 101 of the intake tube 100 is preferably formed having a plurality of resilient fingers which are received within the enlarged opening 95 formed through the second flange portion 93 of the pump housing 90 in a snap fit type connection. An O-ring 103 may be provided about the resilient fingers of the outlet end 101 to provide a fluid tight connection between the intake tube 100 and the pump housing 90. The inlet end 102 of the intake tube 100 extends downwardly into a lubricant sump defined in the lower portion of the transmission housing 14. The inlet end 102 of the intake tube 100 is preferably covered with a screen (not shown) to prevent debris in the sump from being drawn into the pump 80.

A gear 110 is provided for rotatably driving the pump 80 when the transmission 10 is operated. The pump drive gear 110 has a plurality of external teeth formed thereon which are adapted to mesh with any rotatably driven gear or shaft contained in the transmission 10 so as to be rotatably driven thereby whenever the transmission 10 is operated. For example, the pump drive gear 110 may mesh with one of the gears located within the auxiliary section of the transmission 10. The pump drive gear has a central aperture 111 formed therethrough, through which the second end 86 of the pump drive shaft 83 extends. The central aperture 111 of the pump drive gear 110 has a flat portion formed therein which cooperates with the flat portion 87 formed on the rearward end 86 of the pump drive shaft 83. A snap ring 115 is disposed within an annular groove (not shown) formed in the rearward end 86 of the pump drive shaft 83 to retain the pump drive gear 110 thereon. Thus, it will be appreciated that when the pump drive gear 110 is rotated during operation of the transmission 10, the pump drive shaft 83 is rotated therewith to operate the pump 80. The overall operation of the lubricant distribution system will be described further below.

Figure 6:
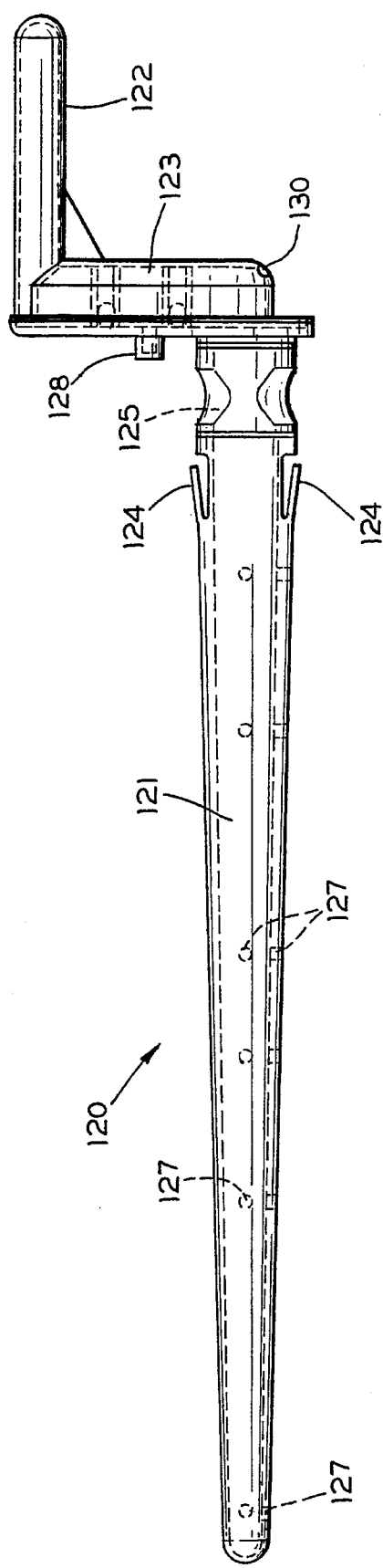
FIG. 6 is an enlarged side elevational view of a lubricant discharge tube of the lubricant distribution system.
Figure 7:
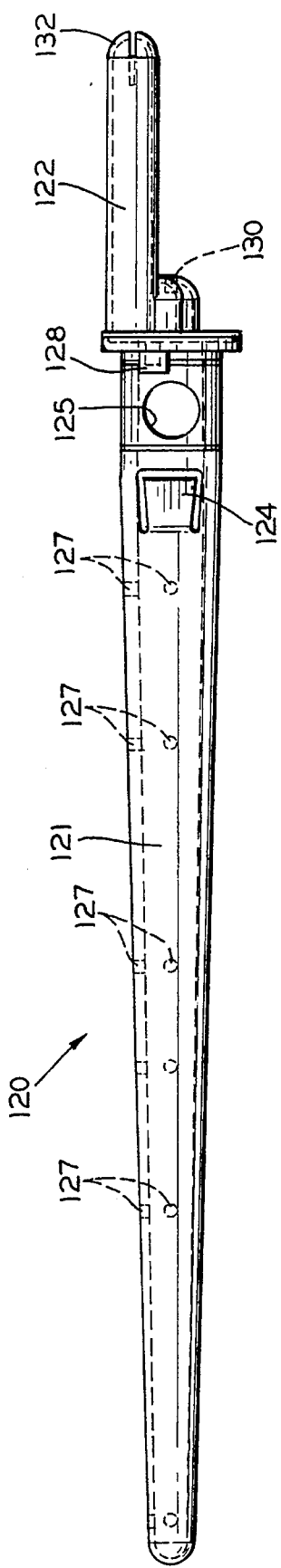
FIG. 7 is a top plan view of the lubricant discharge tube illustrated in FIG. 6.

The lubricant distribution system further includes a lubricant discharge tube, indicated generally at 120. As best shown in FIGS. 6 and 7, the lubricant discharge tube 120 includes first and second hollow discharge legs 121 and 122 which are connected together by a hollow intermediate body 123. The first leg 121 is inserted through and supported snugly within the axially extending bore 65 formed through the interior wall 14b to support the lubricant discharge tube 120 within the transmission housing 14. The discharge tube 120 is preferably formed of a resilient plastic material, such as glass filled nylon. Preferably, the first leg 121 of the lubricant discharge tube 120 is provided with one or more resilient, outwardly extending tabs 124. During installation of the lubricant discharge tube 120, the first leg 121 is inserted axially through the bore 65. During this process, the tabs 124 contact the inner wall of the bore 65 and are deflected radially inwardly. When the first leg 121 has been inserted through the bore 65 a sufficient distance such that the tabs 124 are clear of the interior wall 14b, the tabs 124 expand radially outwardly and abut the forward side of the interior wall 14b. As a result, the first leg 121 cannot be withdrawn from the bore 65 unless the tabs 124 are depressed radially inwardly.

A cylindrical protrusion 128 is formed on the forward side of the intermediate body 123. The protrusion 128 is adapted to be received in a corresponding counterbore 129 (see FIG. 2) formed in the rearward side of the interior wall 14b of the transmission housing 14. The cooperation of the protrusion 128 with the counterbore 129 functions to maintain the lubricant discharge tube 120 in a desired orientation relative to the transmission housing 14 after installation.

As mentioned above, the first leg 121 of the lubricant discharge tube 120 is hollow, and the forward end thereof (the left end when viewing FIGS. 6 and 7) is closed. An inlet port 125 is formed through the rearward end of the first leg 121, adjacent to the intermediate body 123 thereof. The inlet port 125 communicates with the hollow interior of the first leg 121. When the lubricant discharge tube 120 is installed as described above, the inlet port 125 is aligned with and communicates with the internal passageway 64 formed through the interior wall 14b. Thus, the interior portions of the lubricant discharge tube 120 are in fluid communication with the internal passageway 64. A plurality of discharge apertures 127 are formed through the bottom and side portions of the first leg 121 of the lubricant discharge tube 120. The apertures 127 communicate with the hollow interior of the first leg 121 and are positioned to spray lubricant onto the various gears and bearings located within the main section of the transmission 10.

The inlet port 125 of the lubricant discharge tube 120 also communicates with the hollow interior of the intermediate body 123 thereof. A discharge aperture 130 is formed in the intermediate body 123 and communicates with the hollow interior thereof. The discharge aperture 130 is positioned to spray lubricant onto the various gears and bearings located within the auxiliary section of the transmission 10. The hollow interior of the intermediate body 123 also communicates with the hollow interior of the second leg 122 of the lubricant discharge tube 120. A discharge slot 132 is formed through the second leg 122 of the lubricant discharge tube 120. The slot 132 communicates with the hollow interior of the second leg 122 and is also positioned to spray lubricant onto the various gears and bearings located within the auxiliary section of the transmission 10.

When the transmission 10 is operated, the pump drive gear 110 is rotated by virtue of its cooperation with the associated driven shaft contained within the transmission 10, as discussed above. As a result, the pump drive shaft 83, the inner pump element 82, and the outer pump element 81 are also rotated within the pump housing 90. Because of the engagement of their associated teeth, the rotational movement of the inner pump element 82 and the outer pump element 81 draws lubricant inwardly from the sump defined in the lower portion of the transmission housing 14 through the intake tube 100, the aperture 95 formed through the pump housing 90, and the aperture 72 formed through the retainer plate 70 into the first channel 61 formed in the interior wall 14*b*. The lubricant is then drawn through the channel 61 and through the pump inlet slot 73 formed through the retainer plate 70 into the pump 80. From the pump 80, the lubricant is pumped through the pump outlet slot 74 formed through the retainer plate 70 and into the second channel 62. As discussed above, the lubricant normally flows through the second channel 62 to the port 62*a*. However, if the pressure of the lubricant within the second channel 62 is high enough to open the pressure relief valve 69, then the lubricant would flow directly from the second passageway 62 through the bypass channel 68 and into the third channel 63, bypassing the ports 62*a* and 63*a*.

Assuming that the pressure relief valve 69 remains closed, the lubricant passes outwardly of the transmission housing 14 through the port 62*a*, through the fluid conduit 62*b* to the filter 140 and/or the heat exchanger 141, and back through the fluid conduit 63*b* to the port 63*a*, as shown in FIG. 4. In the alternate embodiment illustrated in FIG. 5, the lubricant passes from the port 62*a* through the internal passageway 67*a* formed in the cover plate 67 and directly back to the port 63*a*. In either event, the lubricant passes from the port 63*a* to the third channel 63 and up the internal passageway 64 to the axially extending bore 65 formed in the interior wall 14*b* of the transmission housing 14. As discussed above, the internal passageway 64 communicates with the inlet port 125 of the lubricant discharge tube 120. Thus, lubricant is pumped into the inlet port 125 of the lubricant discharge tube 120. From the inlet port 125, the lubricant is forced through the first leg 121 and is sprayed out of the apertures 127 onto the regions where the main section gears mesh. The lubricant is also forced through the intermediate body 123 and is sprayed out of the aperture 130 onto the meshing gears in the auxiliary section of the transmission 10. From the intermediate body 123, the lubricant is also forced through the second leg 122 and is sprayed out of the discharge slot 132 onto the meshing gears in the auxiliary section of the transmission 10. The sprayed lubricant falls from the meshing gears under the influence of gravity and is collected in the sump defined in the lower portion of the transmission housing 14. As discussed above, the lubricant is initially drawn from this sump defined in the lower portion of the transmission housing 14. Thus, it can be seen that a continuous path is established for continuously circulating the lubricant throughout the transmission 10 during use.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A transmission comprising:

a housing defining a sump;

an input shaft extending within said housing;

an output shaft extending within said housing;

a plurality of gears contained within said housing and selectively connectable between said input shaft and said output shaft for providing a plurality of gear ratios therebetween;

a pump;

a first fluid conduit providing fluid communication between said sump and said pump;

a lubricant discharge member disposed within said housing and having at least one aperture formed therein; and a second fluid conduit providing fluid communication between said pump and said lubricant discharge member, a portion of one of said first and second fluid conduits including a channel formed in a portion of said housing and a plate secured to said housing over said channel to form said portion of said one of said first and second conduits.

2. The transmission defined in claim 1 wherein a portion of said first fluid conduit includes a channel formed in a portion of said housing and a plate secured to said housing over said channel to form said portion of said conduit providing fluid communication between said sump and said pump.

3. The transmission defined in claim 2 wherein a portion of said second fluid conduit includes a second channel formed in a portion of said housing and a plate secured to said housing over said second channel to form said portion of said second fluid conduit providing fluid communication between said pump and said lubricant discharge member.

4. The transmission defined in claim 2 wherein a portion of said second fluid conduit includes a second channel formed in a portion of said housing, a third channel formed in a portion of said housing, and a plate secured to said housing over said second and third channels to form said portion of said second fluid conduit providing fluid communication between said pump and said lubricant discharge member.

5. The transmission defined in claim 4 wherein said second channel provides fluid communication between said pump and a first port formed in said housing, said third channel provides fluid communication between a second port formed in said housing and said lubricant discharge member, and further including means for providing fluid communication between said first and second ports.

6. The transmission defined in claim 5 wherein said means for providing fluid communication between said first and second ports includes a pair of fluid conduits and an external device for conditioning the lubricant.

7. The transmission defined in claim 3 further including an internal passageway formed in a portion of said housing and providing fluid communication between said second channel and said lubricant discharge member.

8. The transmission defined in claim 3 further including a bypass passageway extending between said first and second channels and a pressure relief valve disposed within said bypass passageway for selectively providing fluid communication therebetween.

9. The transmission defined in claim 1 further including a recess formed in a portion of said housing having a bearing retained therein for rotatably supporting a shaft, and wherein said plate also retains said bearing in said recess.

10. The transmission defined in claim 1 wherein said housing includes an internal wall having a bore formed therethrough, and wherein said lubricant discharge member extends within said bore and is supported on said internal wall of said housing.

11. A transmission comprising:

a housing including an internal wall having a bore formed therethrough, said housing defining a sump;

an input shaft extending within said housing;

an output shaft extending within said housing;

a plurality of gears contained within said housing and selectively connectable between said input shaft and said output shaft for providing a plurality of gear ratios therebetween, at least one of said input shaft, said output shaft, and said plurality of gears being supported on said internal wall of said housing;

a pump;

a first fluid conduit providing fluid communication between said sump and said pump;

a lubricant discharge member extending within said bore and supported on said internal wall of said housing, said lubricant discharge member having at least one aperture formed therein; and a second fluid conduit providing fluid communication between said pump and said lubricant discharge member.

12. The transmission defined in claim 11 wherein said lubricant discharge member has a tab formed thereon which engages said internal wall of said housing to prevent removal of said lubricant discharge member from said bore.

13. The transmission defined in claim 12 wherein said tab is flexible to selectively permit removal of said lubricant discharge member from said bore.

14. The transmission defined in claim 11 wherein said lubricant discharge member has a plurality of tabs formed thereon which engage said internal wall of said housing to prevent removal of said lubricant discharge member from said bore.

15. The transmission defined in claim 11 wherein said lubricant discharge member includes hollow first and second legs.

16. The transmission defined in claim 15 wherein one of said first and second legs has a plurality of apertures formed therethrough for spraying lubricant onto said plurality of gears.

17. The transmission defined in claim 16 wherein each of said first and second legs has a plurality of apertures formed therethrough for spraying lubricant onto said plurality of gears.

18. The transmission defined in claim 15 wherein said lubricant discharge member further includes a hollow intermediate body connected between said first and second legs, and wherein an aperture is formed through said hollow intermediate body for spraying lubricant onto said plurality of gears.

19. The transmission defined in claim 11 wherein a portion of one of said first and second fluid conduits includes a channel formed in a portion of said housing and a plate secured to said housing over said channel to form said portion of said one of said first and second conduits.

20. A transmission comprising:

a housing including an internal wall having a bore formed therethrough, said housing defining a sump;

an input shaft extending within said housing;

an output shaft extending within said housing;

a plurality of gears contained within said housing and selectively connectable between said input shaft and said output shaft for providing a plurality of gear ratios therebetween;

a pump disposed within said housing;

a first fluid conduit providing fluid communication between said sump and said pump;

a lubricant discharge member extending within said bore and supported on said internal wall of said housing, said lubricant discharge member having at least one aperture formed therein, said lubricant discharge member having a tab formed thereon which engages said internal wall of said housing to prevent removal of said lubricant discharge member from said bore; and a second fluid conduit providing fluid communication between said pump and said lubricant discharge member.

21. The transmission defined in claim 20 wherein said tab is flexible to selectively permit removal of said lubricant discharge member from said bore.

22. The transmission defined in claim 20 wherein said lubricant discharge member has a plurality of tabs formed thereon which engage said internal wall of said housing to prevent removal of said lubricant discharge member from said bore.

* * * * *